United States Patent
D'Ursi

(10) Patent No.: US 8,551,282 B2
(45) Date of Patent: Oct. 8, 2013

(54) HEATING SYSTEM FOR HOT COUPLING OR LAMINATING FILMS OR THIN SHEETS

(75) Inventor: Francesco D'Ursi, Volpiano (IT)

(73) Assignee: S.A.T. Engineering S.A.S. di Francesco d'Ursi & C., Turin (IT)

( * ) Notice: Subject to any disclaimer, the term of this patent is extended or adjusted under 35 U.S.C. 154(b) by 253 days.

(21) Appl. No.: 12/602,950

(22) PCT Filed: Jun. 4, 2008

(86) PCT No.: PCT/IB2008/052181
§ 371 (c)(1),
(2), (4) Date: Dec. 3, 2009

(87) PCT Pub. No.: WO2008/149295
PCT Pub. Date: Dec. 11, 2008

(65) Prior Publication Data
US 2010/0147461 A1 Jun. 17, 2010
US 2010/0326595 A2 Dec. 30, 2010

(30) Foreign Application Priority Data

Jun. 5, 2007 (IT) .............................. TO2007A0390

(51) Int. Cl.
B32B 37/06 (2006.01)
(52) U.S. Cl.
USPC .................... 156/309.9; 156/309.6; 156/322; 156/499; 156/543
(58) Field of Classification Search
USPC ............... 156/82, 272.2, 308.2, 309.6, 309.9, 156/322, 359, 378, 380.1, 497, 499, 273.3, 156/324, 379.8, 380.9, 543, 555; 432/13, 432/19, 31; 219/388, 405, 469
See application file for complete search history.

(56) References Cited

U.S. PATENT DOCUMENTS

| | | | | |
|---|---|---|---|---|
| 2,224,370 A | * | 12/1940 | Wescott | 156/281 |
| 2,898,973 A | * | 8/1959 | Marsh | 156/499 |
| 3,042,568 A | | 7/1962 | Ludowici at al. | |
| 3,210,227 A | * | 10/1965 | Shichman | 156/82 |
| 3,368,932 A | * | 2/1968 | Weill et al. | 156/497 |
| 3,633,891 A | * | 1/1972 | Heran et al. | 432/6 |
| 3,931,450 A | * | 1/1976 | Patton et al. | 428/319.7 |
| 5,173,222 A | * | 12/1992 | Young et al. | 264/35 |
| 5,620,554 A | * | 4/1997 | Venable | 156/496 |

FOREIGN PATENT DOCUMENTS

| | | |
|---|---|---|
| FR | 1550743 | 12/1968 |
| GB | 968155 | 8/1964 |
| GB | 1289219 | 9/1972 |

OTHER PUBLICATIONS

International Search Report for PCT/IB2008/052181.
International Preliminary Report on Patentability for PCT/IB2008/052181.

* cited by examiner

*Primary Examiner* — John Goff
(74) *Attorney, Agent, or Firm* — Buchanan Nipper

(57) ABSTRACT

A heating system for hot coupling or laminating at least two films or thin sheets, said heating system comprising at least a heater group comprising at least a burner, and an airtight chamber.

21 Claims, 7 Drawing Sheets

HEATING SYSTEM FOR HOT COUPLING OR LAMINATING FILMS OR THIN SHEETS

The present invention refers to a heating system to be used in the plants, and in the corresponding processes, for hot coupling or laminating films or thin sheets.

In particular, but not exclusively, the present invention refers to a heating system to be used in the plants, and in the corresponding processes, for hot coupling or laminating plastic material films or thin sheets in order to obtain synthetic membranes.

The present invention can also be advantageously exploited for hot coupling or laminating other materials such as, for instance, aluminium or paper sheets, bituminous membranes and the like.

Synthetic membranes are specially required for roofing waterproofing, underground works, hydraulic works or swimming pools, packaging, protection membranes and floor coverings.

Synthetic membranes, in general, consist of two films of synthetic plastic material, such as PVC (polyvinyl chloride), PE (polyethylene), PP (polypropylene), TPO (thermoplastic olefins) and MTPO (modified thermoplastic olefins), with a possible intermediate reinforcement, such as polyester meshes or glass fibres layers, inserted therebetween.

Synthetic membranes or, in general, coupled films, i.e. two films of the same type joined together, can be manufactured according to the following principles:
  physical (e.g., compression through rotating cylinders, thus obtaining steady and porosity-free couplings);
  chemical (e.g., application on a film, called support film, of an adhesive, and then another film, by a continuous process); or
  physico-chemical (e.g., compression through rotating cylinders of pre-impregnated and pre-heated films).

Synthetic membranes can be manufactured by conventional manufacturing processes such as casting, coating, extrusion and co-extrusion, calendering and spreading for coupling or laminating; the corresponding manufacturing plants require the construction of huge lines, possibly providing drying, gelling and cooling tunnels.

Examples of conventional manufacturing processes can be:
  calender coupling: this process provides for introducing pre-spread support stripes among the last cylinders of the calender or with an additional cylinder, or as a coverings support layer, with following expansion of the calendered middle layer below the expansion temperature;
  spreading: this process provides for determining the thickness of the spreading thick mass by conventional spreading machines with doctor knife (spreading blade); the support belt is made to pass under the blade, and this latter carries out the lamination of the spreading thick mass; this process needs covering fluid masses and following drying or gelling tunnels;
  cylinder coupler-spreader: this process allows to reach high spreading rates and higher thicknesses; this process needs covering fluid masses and following drying or gelling tunnels;
  fusion cylinders spreading: this process provides for applying the covering as plastisol, on an additional cylinder;
  "hot melt" process: this process provides for possible coupling through flat sheet die used as extrusion station; this process does not need drying or gelling tunnels downstream;
  lamination: this process provides for laminating different film- or leaf-shaped materials by operating with solvent-based adhesives, dispersions or by fusion.

All the aforesaid processes show the drawback of not being able to reach the high temperature necessary for the coupling, when operating with certain plastic materials such as PVC, since the heat dispersion during the coupling step of the two films occurs in a very rapid way, also due to the water cooling of the calenders.

It is an object of the present invention to overcome the drawbacks of the above-mentioned known methods, by providing a heating system allowing to reach in short time, as well as to maintain with time, the temperatures necessary for hot coupling or laminating at least two films or thin sheets.

It is a further object of the present invention to overcome the difficulties residing in coupling a reinforcement with at least one film according to the known methods, by providing a heating system allowing to obtain a multilayer reinforced membrane.

It is a further object of the present invention to obtain a size reduction of the heating system, by providing a heating system that can be arranged in an existing production line without the need of substantial modifications.

It is a further object of the present invention to provide a heating system complying with the safety requirements.

Moreover, it is still an object of the present invention to provide a heating system allowing to obtain the final product, e.g. a synthetic membrane, with a single manufacturing step and without needing complementary tools, such as additional cylinders, spreading blades and relevant drying furnaces.

These and other objects are achieved by a heating system as claimed in the appended claims.

Thanks to the structure of the claimed heating system—including a chamber comprising a radiating face and a non-radiating face—the heat generated by the heating system is efficiently directed towards the films or sheets to be heated, so that the temperature of said films or sheets can be strongly increased even in case of short exposure times of the films or sheets to the heating system.

Thanks to the claimed heating system, notwithstanding the fact that the reinforcement remains unchanged even at very high temperatures, multilayer reinforced membrane are easily obtained, contrary, for instance, to the co-extrusion processes.

It is to be noted that, according to the invention, the heat generated by the heater group is directed almost exclusively towards the sheets or films to be heated.

As a consequence, the other components of the production line are not affected by said heat and the risk of suffering heat induced damages and/or deformations is avoided; furthermore, the risk of workers to be injured is also avoided.

Thanks to its high efficiency, the heating system according to the invention can have reduced dimensions, so that it can be easily introduced in existing production lines.

The heating system for hot coupling or laminating at least two films or thin sheets according to the invention will be now disclosed with reference to the appended drawings, given only by way of non limiting example, in which.

Figure 1:
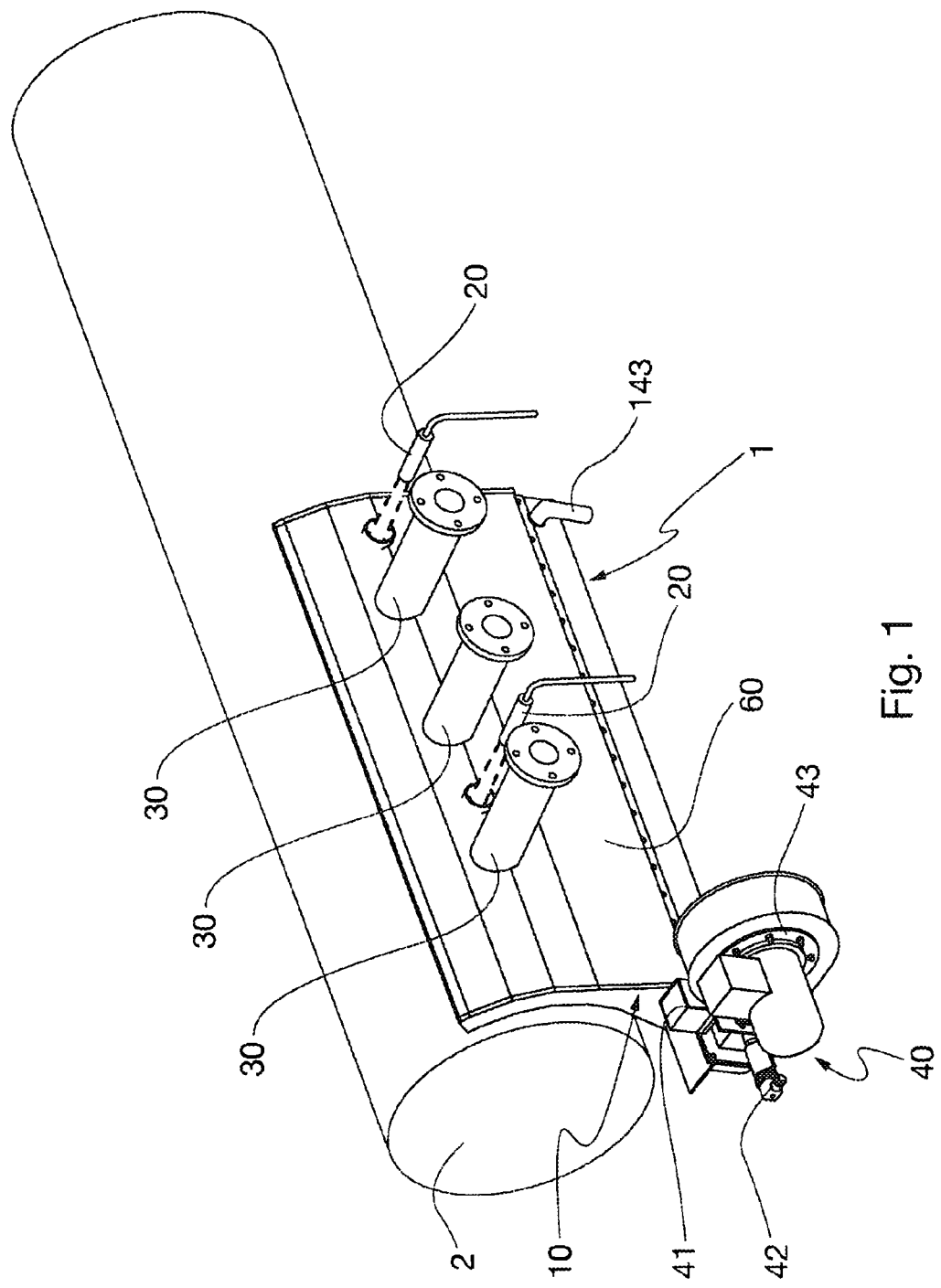
FIG. 1 is a perspective view showing a preferred embodiment of the heating system according to the invention applied to a calender cylinder.

With reference to FIG. 1, a preferred embodiment of the heating system 1 according to the invention applied to the hot coupling or laminating of PVC or plastic material films dragged by a calender cylinder 2 or similar moving support is shown.

Figure 2:
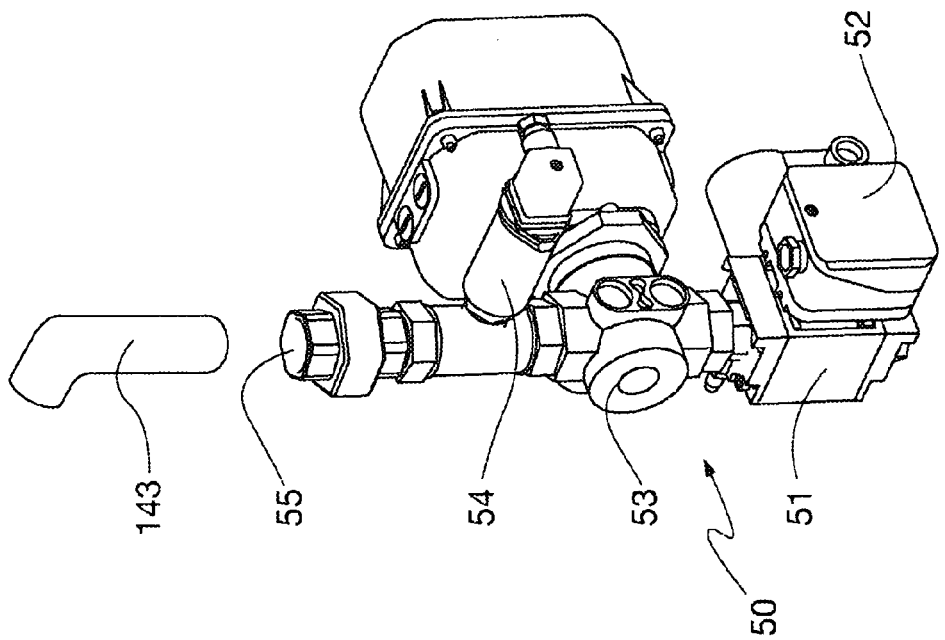
FIG. 2 is a perspective view showing the fuel control group of the heating system of FIG. 1.

Said heating system 1 comprises at least:
a heater group 10,
two temperature detectors 20,
three connecting pipes 30,
a first control group 40 for the combustive agent, and
a second control group 50 for the fuel, shown in FIG. 2.

The heating system 1 according to the invention can further comprise an insulating carter 60 in order to improve the heating system efficiency, as well as to protect both the other elements of the production line and the workers from the heat generated by the heater is group 10.

Said heating system 1 can be fed with any kind of fuel, preferably a gaseous fuel such as methane, LPG, town gas, and the like.

Said combustive agent is preferably combustive air, even if other combustive agents, such as oxygen, could be used for reaching higher temperatures.

Preferably, said two temperature detectors 20 are infra-red thermocouples.

A heating system 1 according to the present invention can be applied as such or can be understood as a basic module for more complex arrangements.

Figure 4:
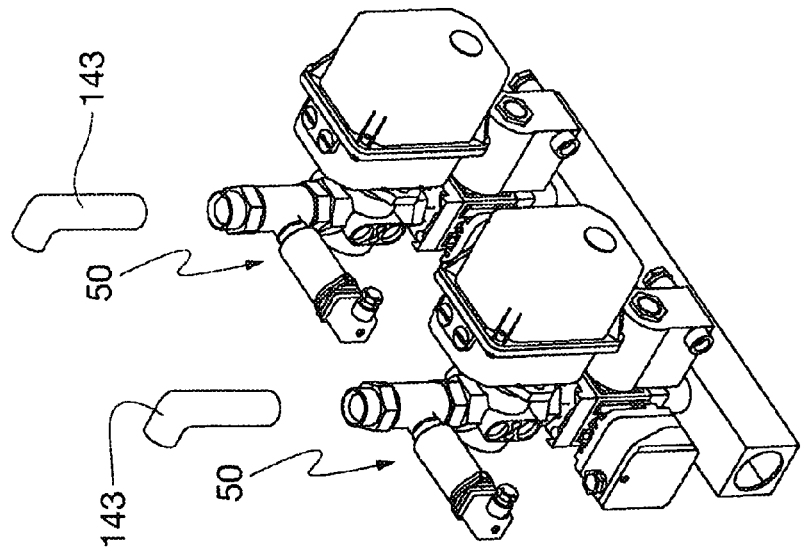
FIG. 4 is a perspective view showing the fuel control groups of the heating systems of FIG. 3.
Figure 3:
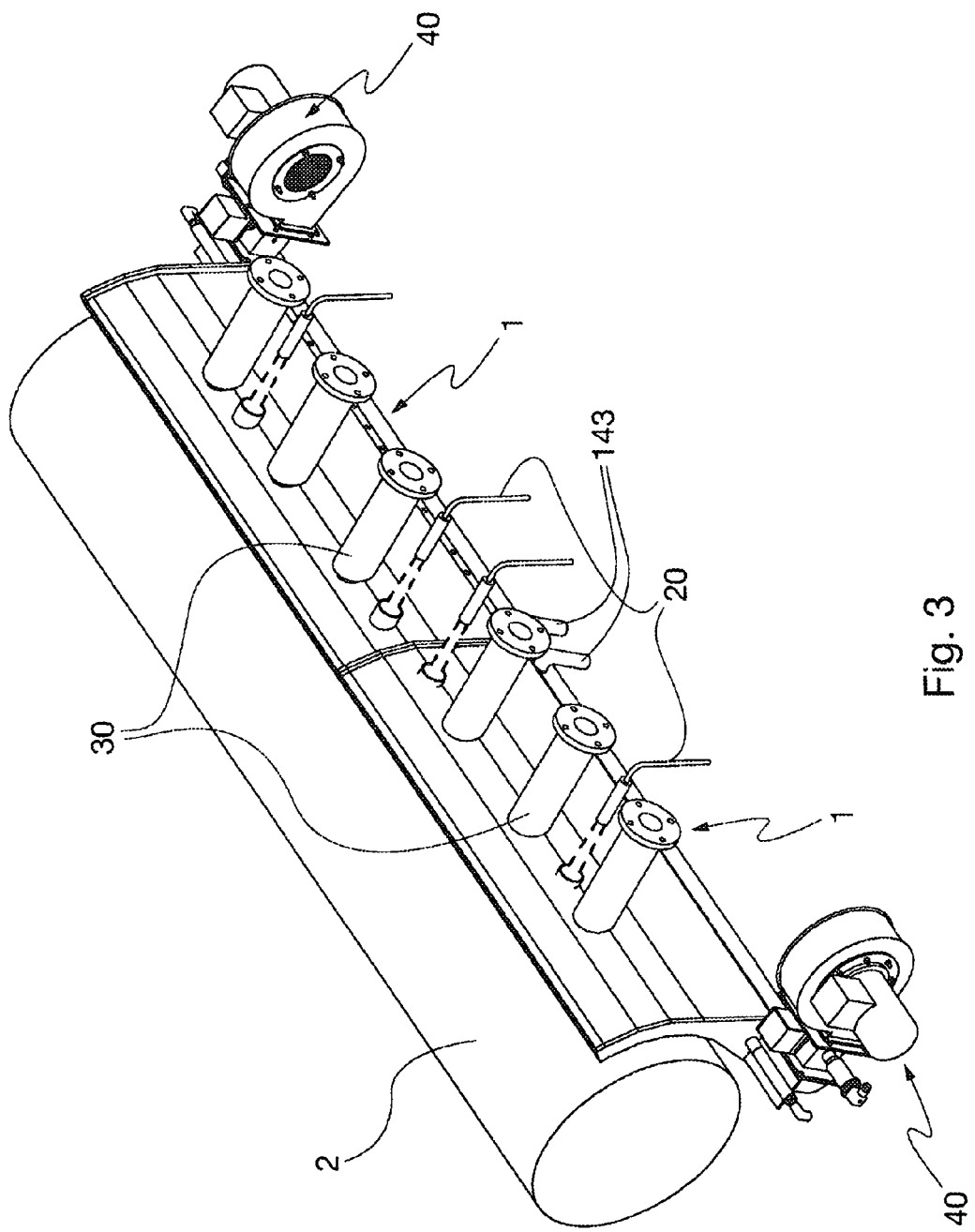
FIG. 3 is a perspective view showing two heating systems according to the invention applied in parallel to a calender cylinder.

Two or more heating systems 1 according to the invention can be applied in parallel to one ore more calender cylinders 2, said heating systems comprising corresponding second control groups 50 for the fuel; only by way of non limiting example, FIG. 3 shows an arrangement comprising two heating systems 1 applied in parallel to a calender cylinder 2 of about 2 meters length, said two heating systems 1 comprising two corresponding second control groups 50 for the fuel shown in FIG. 4.

Any other arrangement of two or more heating systems 1 according to the invention is deemed to fall within the scope of the present invention; other arrangements can include, for instance, applications in series, diagonally and so on.

Figure 5:
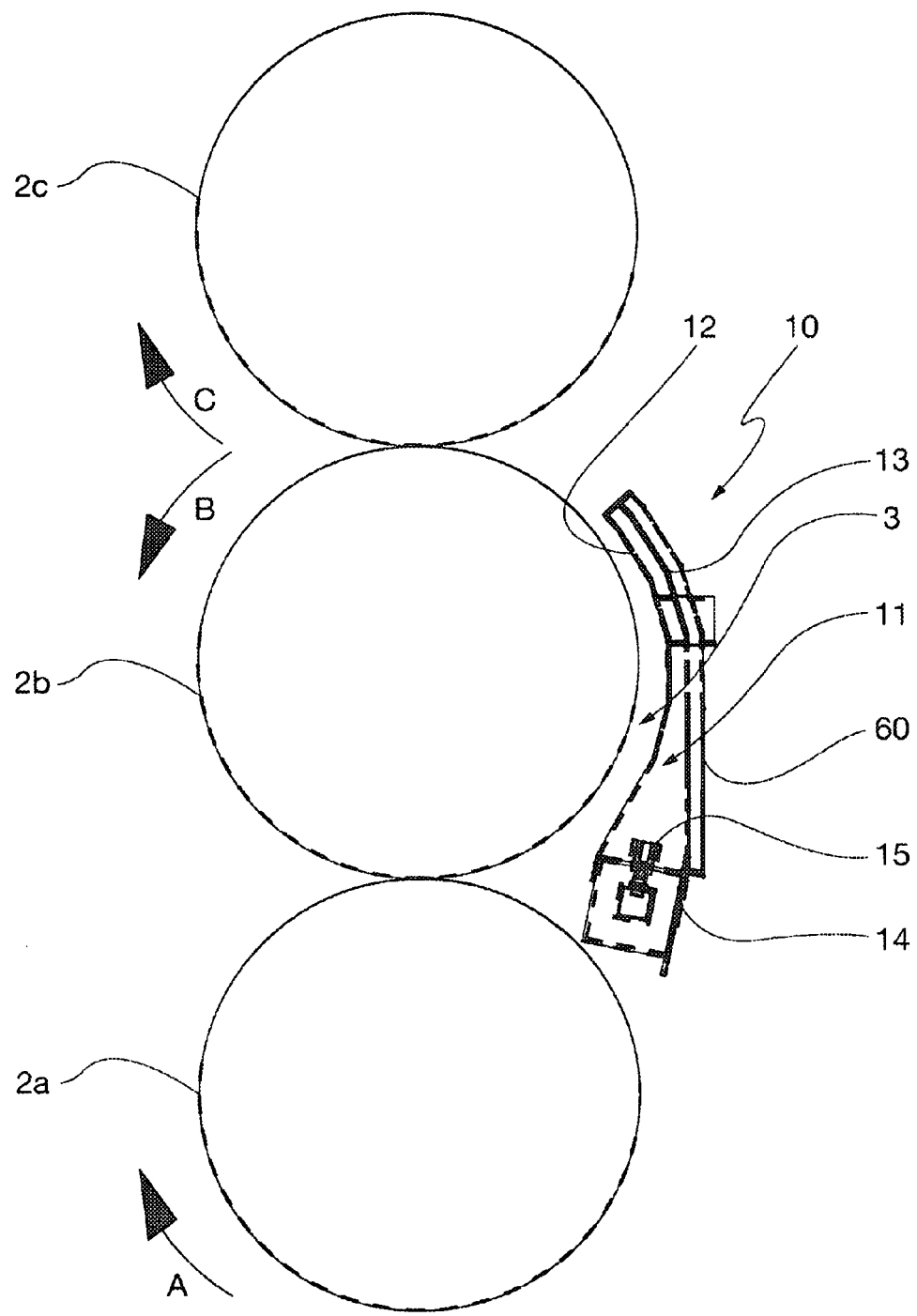
FIG. 5 is a lateral view showing the heater group of the heating system of FIG. 1.

Making now reference to FIG. 5, in which said heater group 10 of said heating system 1 is shown while radiating one of a set of three calender cylinders 2a, 2b, 2c, said heater group 10 comprises an airtight chamber 11, delimited by a radiating internal face 12 and a non-radiating external face 13, and a burner 14 comprising at least one combustion head 15; said non-radiating external face 13 can be insulated by the insulating carter 60 accurately fitting said non-radiating external face 13 of said airtight chamber 11.

Said heater group 10 further comprises a first collector for the combustive agent and a second collector for the fuel, which are separated from each other; these and other burner components will be described more in detail further on with reference to FIG. 9.

Said heater group 10 is properly shaped so that, through said radiating internal face 12 of said airtight chamber 11, it is able to give the heat necessary for reaching the hot coupling temperature of the PVC or plastic material films; said heat is released by the hot combustion fumes circulating inside said airtight chamber 11 and produced from the combustion of the fuel, fed to said burner 14 of said heater group 10, by said at least one combustion head 15.

It is worthy to note that said hot combustion fumes represent an aeriform flow that is stably at temperature.

Said heater group 10 is positioned in face of said calender cylinder 2b and at a proper distance therefrom so to define, between said radiating internal face 12 and said calender cylinder 2b, a heating volume 3 through which the at least two PVC or plastic material films pass; said heating volume 3, as well as the corresponding radiation heating of the at least two PVC or plastic material films dragged by the calender cylinders 2a, 2b, 2c, are optimised by making the radiating internal face 12 of said heater 10 to suitably fit both the size and the surface profile of said calender cylinder 2b.

Referring again to FIG. 1, said two temperature detectors 20 are provided for detecting the surface temperature of the moving film and said three connecting pipes 30 are connected to a suction plant of the combustion fumes; moreover, said first control group 40 for the combustive agent comprises a pressure regulator 41, a pressure transmitter 42 and a fan 43 for adjusting the combustive agent flow-rate.

Said suction plant is a forced suction plant that, through said three connecting pipes 30, sucks the hot combustion fumes and puts said airtight chamber 11 under depression so to maintain the flames ignited and to create, therefore, a "hot combustion fumes loop" able to uniformly heat said radiating internal face 12.

Referring again to FIG. 2, said second control group 50 for the fuel comprises a pressure regulator 51, a blocking valve 52, an adjustment valve 53 and a pressure transmitter 54 for adjusting the fuel flow-rate, as it will be explained in detail hereinbelow; said second control group 50 for the fuel is connected to the heater group 10 through a stiff or flexible connection inserted into hole 55 of said second control group 50 for the fuel and into connection 143 of said heater group 10 visible in FIG. 1.

Figure 6:
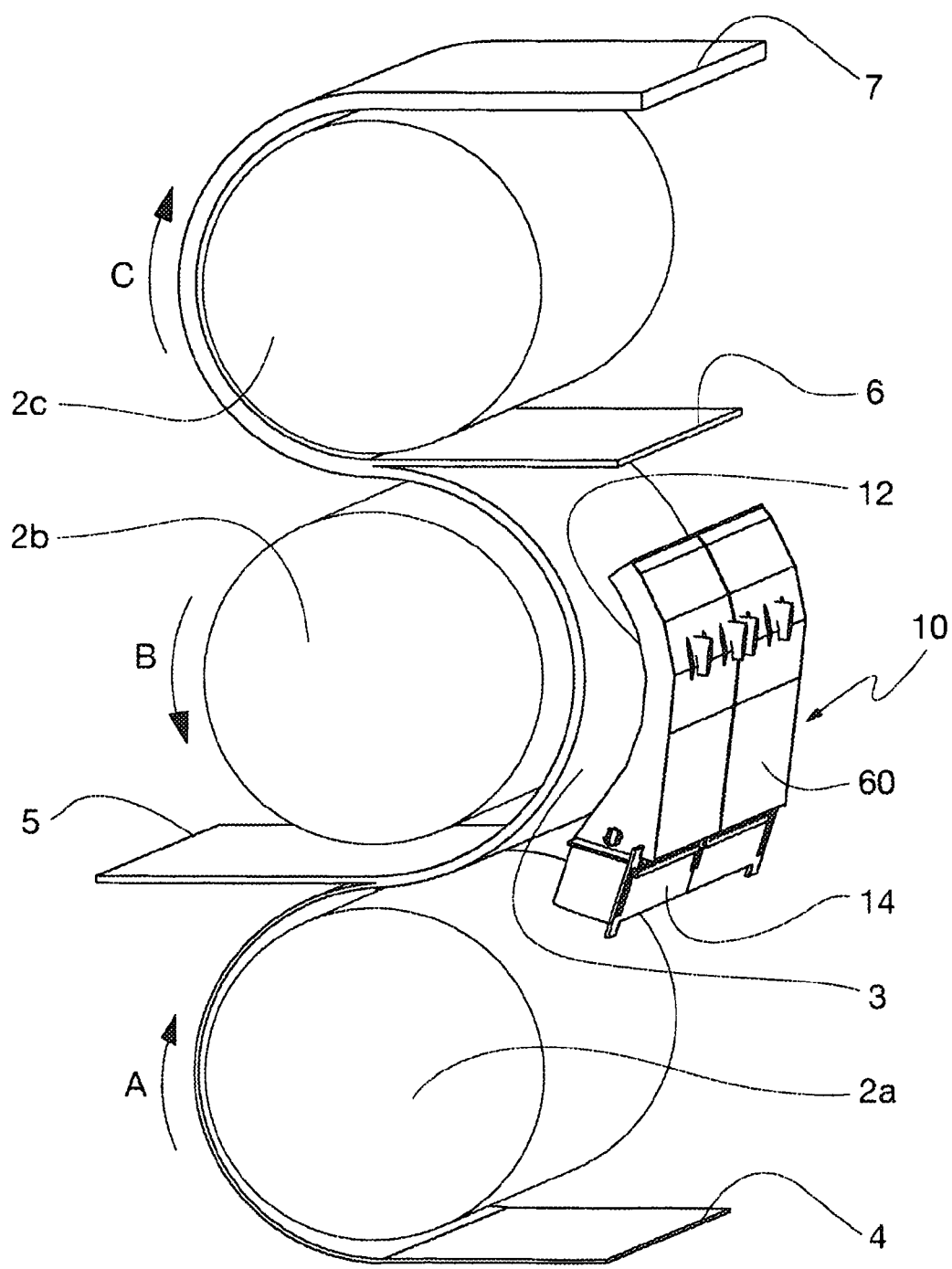
FIG. 6 is a perspective view showing the heater group of FIG. 5.

Referring again to FIG. 5, the arrows A, B and C denote the directions of the path through which two PVC films and a reinforcement sheet are dragged by the calender cylinders 2a, 2b, 2c until obtaining a multilayer membrane; such a path, which is illustrated only by way of non limiting example, is described in detail hereinbelow with reference to FIG. 6.

A sheet of reinforcement 4 is dragged by the first cylinder 2a, which is clockwise rotating according to arrow A, and joins the first film 5; by means of the anti clockwise movement (according to arrow B) of the second cylinder 2b, they are dragged into the heating volume 3.

When the combination of reinforcement sheet 4 and first film 5 arrives in front of the radiating internal face 12 of the heater group 10, it is heated by the heat radiated therefrom; this way, said reinforcement sheet 4 results to be fastened to said first film 5.

Upon exiting the radiation step, a second film 6, dragged by the third cylinder 2c clockwise rotating according to arrow C, joins the combination of reinforcement sheet 4 and first film 5, on the side of said reinforcement sheet 4; therefore, the finished product, that is the multilayer membrane 7 is obtained.

It is believed, without intending to be bound by this assumption, that the heat stored by the combination of reinforcement sheet 4 and first film 5 in the radiation step is enough also for fastening said third film 7 to said combination of reinforcement sheet 4 and first film 5.

The example illustrated hereinabove provides two PVC films, but other plastic material, such as polyethylene and polypropylene, can be suitably used to obtain multilayer membranes, while polyester meshes or glass fibres layers can be used as the internal reinforcement sheet.

The preferred embodiment illustrated hereinabove is not limiting in terms of scope of the invention; in fact, the reinforcement sheet 4 is optionally inserted between the two films to be coupled.

Furthermore, the heating system according to the invention can also be employed for coupling or laminating films or thin sheets of other materials, such as metallic or paper sheets, bituminous membranes and the like; non-limiting applications to further materials fall within the scope of the present invention.

As it can be appreciated, the above process does not involve neither the application of a compression force nor the use of any adhesive agents for obtaining the final multilayer membrane, contrary to the known conventional processes.

Figure 7:
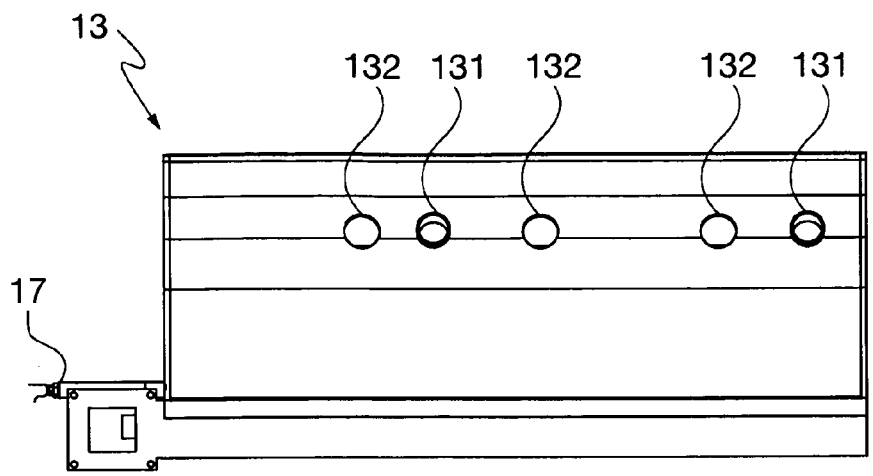
FIG. 7 is a rear view showing the non-radiating face of the heating system of FIG. 1.

With reference to FIG. 7, which shows the non-radiating external face 13 of the airtight chamber 11 according to the present invention, it can be seen:

- two holes 131 for the corresponding tubes containing the temperature detectors 20 for the remote detection of the temperature of the moving plastic films, said tubes passing through both the non-radiating external face 13 and the radiating internal face 12;
- three holes 132 for the corresponding three connecting pipes 30 connected to a suction plant of the combustion fumes; and
- the ignition and flame detection electrode 17.

Figure 8:
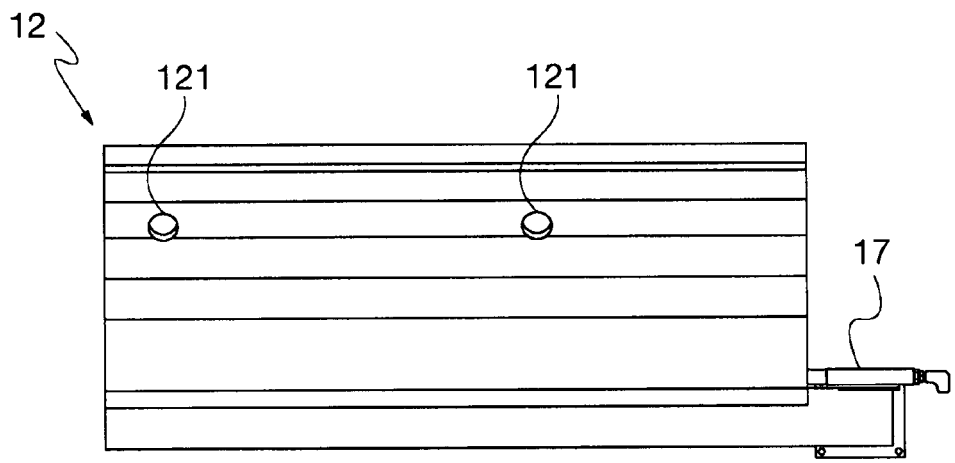
FIG. 8 is a front view showing the radiating face of the heating system of FIG. 1.

With reference to FIG. 8, which shows the radiating internal face 12 of the airtight chamber 11 according to the present invention, it can be seen:

- two holes 121 for the corresponding tubes containing the temperature detectors 20 for the remote detection of the temperature of the moving plastic films, said tubes passing through both the non-radiating external face 13 and the radiating internal face 12; and
- the ignition and flame detection electrode 17.

Figure 9:
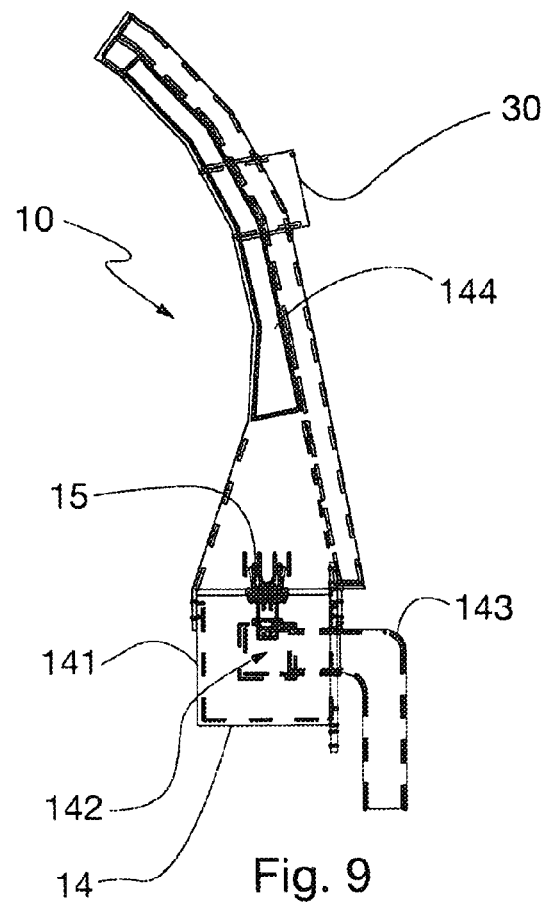
FIG. 9 is a lateral view showing the heater group of the heating system of FIG. 1.

With reference to FIG. 9, which shows a section of the heater group 10 of the heating system 1, it can be seen:

- a first burner collector 141, into which the combustive agent circulates;
- a second burner collector 142, into which the fuel circulates;
- at least one combustion head 15;
- a connection 143 connecting the burner 14 to the second control group 50 for the fuel; and
- shaped profiles 144.

It is to be noticed that said first burner collector 141 and said second burner collector 142 are separated from each other.

Said at least one combustion head 15, thanks to the separation of said combustive agent and fuel collectors 141 and 142, can mix the combustive agent and the fuel only upon the flame formation; this fact gives an optimal combustive agent/fuel rate and also assures an absolute safety of the system, because the combustive agent and the fuel can not produce potentially explosive mixings inside the burner 14.

Figure 10:
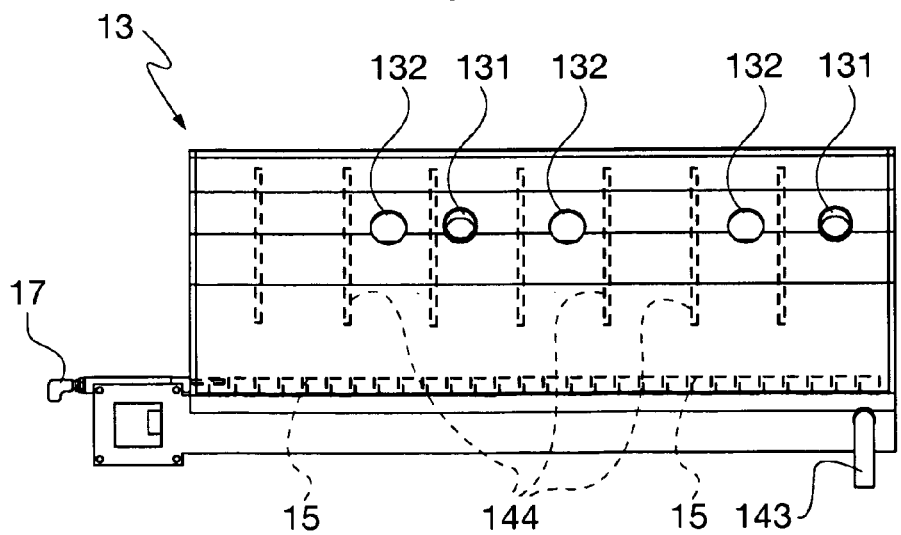
FIG. 10 is a view of the non-radiating face of FIG. 7 showing the shaped profiles.

With reference to FIG. 10, it can be seen that said shaped profiles 144 are suitably positioned, for instance forming a series of baffles, onto the inner walls of said airtight chamber 11 of said heater group 10; thanks to their shape and arrangement, said shaped profiles 144 help to prevent the hot combustion fumes from directly reaching the connecting pipes 30 and to uniformly address the hot combustion fumes along the whole length of the internal surface of the heater group 10, thus allowing said hot combustion fumes to heat the radiating internal face 12 both uniformly and for a longer time.

More in detail, the hot combustion fumes produced from the combustion of the fuel by said at least one combustion head 15 generate an aeriform flow stably at temperature and directed towards the airtight chamber 11; said hot combustion fumes circulate inside said airtight chamber 11 and, thanks to said shaped profiles 144, remain in contact with said radiating internal face 12 for a long time, said radiating internal face 12 being thus sufficiently heated for releasing the heat necessary for stably achieving the coupling temperature of the plastic films passing through the heating volume 3.

Always with reference to FIG. 10, it can be seen that said combustion heads 15 are linearly positioned; nevertheless, said combustion heads 15 can be differently arranged, for instance on parallel rows, grouped together, an so on.

It is worthy to note that the fact that the hot combustion fumes developed from the combustion heads 15 are airtight confined with respect to the heating volume 3 as well as to the external environment assures a uniform heat distribution and a high safety level.

It is also worthy to note that the shaped profiles 144, besides allowing to uniformly address the hot combustion fumes along the whole length of the radiating internal face 12, contribute to increase the mechanical strength of the system and to avoid deformation thereof.

Figure 11:
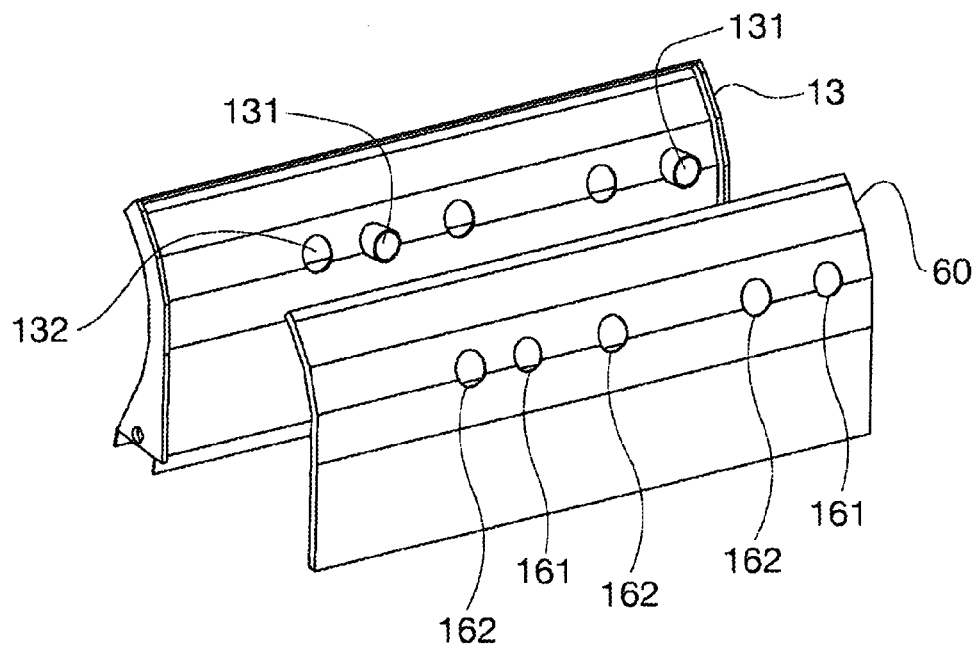
FIG. 11 is a perspective view showing the insulating carter to be applied to the non-radiating face of the heating system of FIG. 1.

With reference to FIG. 11, the insulating carter 60 is accurately fitted and fixed onto the non-radiating external face 13 of the airtight chamber 11 of the heater group 10, with the purpose of thermally insulating it.

Said insulating carter 60 is preferably made of stainless steel or similar material. Said carter is preferably coupled to an insulating jacket (not shown), preferably made of ceramic fibres or other insulating material; alternatively, the insulating carter 60 can be provided with a refrigerating system.

Said insulating carter 60 is also provided with holes 161, corresponding to the two holes 131 of the non-radiating external face 13, and with holes 162, corresponding to the three holes 132 of the non-radiating external face 13.

It is to be noted that the airtight chamber 11 should be made of a material able to withstand very high temperature without suffering deformation or oxidation.

Moreover, if—as in the illustrated embodiment—airtight chamber 11 is homogeneously made with a single material, said material should have a high thermal conductivity and be capable of easily releasing heat, so that heat can be efficiently radiated from the internal radiating face 12 while said carter 60 provides insulation.

Nevertheless, since heat has to be released exclusively from the internal radiating face 12, according to an alternative embodiment of the invention, the airtight chamber 11 has a composite structure and is made of two different materials for the internal face 12 and for the external face 13; more specifically, the non-radiating external face 13 could be made of a material able to withstand very high temperature and capable of insulating the external portion of said airtight chamber 11.

Metals are currently used for making the sole internal radiating face 12 or both the internal radiating face 12 and the external non-radiating face 13, mainly for economical and practical reasons; nevertheless, ceramics or silicon carbide could be conveniently used.

According to this alternative embodiment, the internal radiating face 12 and the external non-radiating face 13 have to be coupled so as to assure airtight integrity of the chamber 11, for instance by welding, melting, casting or the like.

The heating system according to the invention manages to obtain combustion hot combustion fumes at very high temperatures, over 950° C. in case air is employed as combustive agent and even over 1500° C. in case oxygen is employed as combustive agent, as well as to maintain heating uniformity on the whole radiating internal face length; this is made possible by the combustion heads 15, which are in a number proportional to the heater group length and which can generate big powers inside the quite little space of the airtight chamber 11.

By way of non limiting example, it is reported that a heating system has been actually realised for a plant producing membranes of about 2.1 meters width and of about 0.8-2.0 millimeters thickness; said heating system operates with a calender cylinder of 2.4 meters length and 0.5 meters diameter. Said calender cylinder advances at a speed of up to 15 meters per minute.

Said heating system consists of two heater groups, each of which is about 1.2 meters length with internal diameter fitted to the 0.5 meters diameter calender cylinder.

The airtight chamber of each of said two heater groups has an internal volume of about 0.017 m$^3$; each of said two heater groups is equipped with a burner 14 comprising 34 combustion heads developing a rated power even higher than 100-120 kWh.

As anticipated above, the separation between the combustive agent and the fuel makes the stoichiometric calculation more precise; furthermore, said separation makes it possible to use automation advanced technologies allowing a wide modulation field of the power in the same linear burner, i.e. from about 5-10% to 100% of the total installed power.

A combustion process using a Programmable Logic Controller (hereinafter simply PLC) computer for industrial automation is now illustrated by way of non limiting example, in confirmation of the above.

Said PLC computer controls all the operations, from both a safety and a manufacturing process point of view.

The power is controlled and adjusted by the PLC computer depending on calculation of the proportional-integral-derivative control algorithm; the PLC computer calculates the combustion composition on the basis of the signals coming from both the combustive agent pressure transmitters (e.g., 42 in FIG. 1) and from the fuel pressure transmitters (e.g., 54 in FIG. 2), as well as from a series of fixed parameters depending on the system, such as geometrical data and the like.

The PLC computer, once detected the values of both the combustive agent and the fuel pressures, given by the aforesaid pressure transmitters, calculates the stoichiometric rate between the combustive agent and the fuel and, consequently adjusting their flows through an inverter controlling the number of rounds of the combustive agent fan (e.g., 43 in FIG. 1) and a fuel servo-driven valve (e.g., 53 in FIG. 2).

Thanks to the aforesaid PLC computer, the system is able to modulate the power depending on the requirements of the production cycle.

Each heater group is equipped with infra-red thermocouples (e.g., 20 in FIG. 11), which detect the material temperature and send a relevant signal to the PLC computer; the computer will then make to supply the power necessary to bring the material up to the proper temperature.

It will be evident from the above to the person skilled in the art that the capability of developing such a high power in a such reduced volume is a distinguishing feature of the invention.

Considering the high advancement speed of the calender cylinder, it will be also evident that only thanks to the high efficiency of the claimed heating system it is possible to induce a temperature increase of up to 100° C., in the few seconds during which said films pass in front of the radiating face of the heater group.

Referring to the above description, the safety elements provided for by both the type of installation and the laws in force as well as the required control equipment are not described in detail, since they are of the know kind and they are not inherently remarkable for the specific features of the invention.

The number and the type of the components described in the appended drawing, such as thermocouples, connecting pipes, control groups, fans, pressure regulators, pressure transmitters, valves, ignition and flame detection electrodes, and so on, are only intended to illustrate the preferred embodiment of the present invention; therefore, they do not have to be understand as anyhow limiting or binding the present invention, and any other equivalent arrangement is deemed to fall within the scope of the present invention.

The invention claimed is:

1. A heating system for hot coupling or laminating at least two PVC films or PVC thin sheets that are dragged by at least one moving support, said heating system comprising at least a heater group comprising at least: a burner fed with a combustive agent and a fuel, and a chamber delimited by a radiating internal face and a non-radiating external face, wherein said burner comprises at least one combustion head generating an aeriform flow at temperature of combustion fumes that is directed towards said chamber and heats its radiating internal face and wherein said radiating internal face faces said at least one moving support so that a heating volume is defined between said radiating internal face and said at least one moving support through which said at least two films or thin sheets pass and are heated up to their hot coupling temperature by the heat released by said radiating internal face, wherein said chamber is an airtight chamber, wherein said combustion fumes are confined to said airtight chamber until ventilated so as to prevent said combustion fumes from entering the heating volume and the environment where said system is operated, further comprising at least a connecting pipe connecting said heater group to a forced combustion fumes suction plant that, through said at least one connecting pipe, ventilates said combustion fumes and puts said airtight chamber under depression so to maintain the flames ignited.

2. A heating system according to claim 1, wherein said radiating internal face suitably fits both the size and the surface profile of said at least one moving support and is positioned at a proper distance therefrom so to optimise said heating volume.

3. A heating system according to claim 1, wherein said heater group further comprises shaped profiles suitably positioned onto the inner walls of said airtight chamber of said heater group and helping to uniformly address the combustion fumes along the whole length of the internal surface of said heater group, thus allowing said combustion fumes to heat said radiating internal face both uniformly and for a longer time.

4. A heating system according to claim 1, wherein said at least one combustion head comprises combustion heads in a number proportional to the length of said heater group and they can generate big powers inside the quite little space of said airtight chamber.

5. A heating system according to claim 1, further comprising at least one temperature detector for detecting the surface temperature of said at least two films or thin sheets.

6. A heating system according to claim 5, wherein said at least one temperature detector detects said surface temperature and sends a relevant signal to a PLC computer which is able to supply the power necessary to bring said at least two films or thin sheets up to the proper temperature.

7. A heating system according to claim 5, wherein said at least one temperature detector comprises an infra-red thermocouple.

8. A heating system according to claim 1, further comprising a first control group for said combustive agent and a second control group for said fuel.

9. A heating system according to claim 8, wherein said first control group for said combustive agent and said second control group for said fuel are able to modulate the power generated by said combustion heads depending on the requirements of the production cycle.

10. A heating system according to claim 1, wherein said burner further comprises a first burner collector, into which the combustive agent circulates, and a second burner collector, into which the fuel circulates, wherein said first burner collector and said second burner collector are separated from each other.

11. A heating system according to claim 1, further comprising an insulating guard accurately fitted and fixed onto said non-radiating external face of said airtight chamber of said heater group.

12. A heating system according to claim 11, wherein said insulating guard is coupled to an insulating jacket.

13. A heating system according to claim 1, wherein said fuel is a gaseous fuel such as methane, LPG, town gas, and the like.

14. Method for hot coupling or laminating at least two PVC films or PVC thin sheets, said method comprising the steps of: a) dragging by means of a first moving support a first film or thin sheet in front of a radiating internal face of a heater group, wherein said radiating internal face suitably fits both the size and the surface profile of said first moving support; b) performing a radiation step, according to which said first film or thin sheet is heated by the heat radiated from said radiating internal face of said heater group; and c) upon exiting said radiation step, coupling said first film or thin sheet to a second film or thin sheet dragged by a second moving support, thereby obtaining a multilayer membrane;

wherein said heater group comprises at least: a burner fed with a combustive agent and a fuel, and a chamber delimited by said radiating internal face and a non-radiating external face, wherein said chamber is an airtight chamber;

wherein said burner comprises at least one combustion head generating an aeriform flow at temperature of combustion fumes that is directed towards said chamber and heats its radiating internal face;

wherein said radiating internal face faces said first moving support so that a heating volume is defined between said radiating internal face and said first moving support through which said first film or thin sheet is passed and is heated up to its hot coupling temperature by the heat released by said radiating internal face;

wherein said combustion fumes are confined to said chamber until ventilated so as to prevent said combustion fumes from entering the heating volume and the environment where said system is operated; and wherein said heater group connects with a forced combustion fumes suction plant via at least one connecting pipe, wherein said forced combustion fumes suction plant, through said at least one connecting pipe, ventilates said combustion fumes and puts said airtight chamber under depression so to maintain the flames ignited.

15. Method according to claim 14, wherein said steps a), b) and c) are carried out in a single simultaneous and continuous manufacturing step.

16. Method according to claim 14, wherein, before said step a), a reinforcement sheet is joined to said first film or thin sheet.

17. Method according to claim 14, wherein said first and second moving supports are calendars.

18. Method according to claim 17, wherein said calenders are water cooled.

19. Method according to claim 16, wherein said reinforcement sheet is dragged by said first moving support.

20. Method according to claim 16, wherein said reinforcement sheet is sandwiched between said first film or thin sheet and said second film or thin sheet.

21. The heating system according to claim 12, wherein said insulating guard is made of stainless steel or a similar material, and wherein said insulating jacket is made of ceramic fibres or other insulating material.

\* \* \* \* \*

UNITED STATES PATENT AND TRADEMARK OFFICE
CERTIFICATE OF CORRECTION

PATENT NO.       : 8,551,282 B2  
APPLICATION NO. : 12/602950  
DATED            : October 8, 2013  
INVENTOR(S)      : Francesco D'Ursi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this

Fifteenth Day of September, 2015

Michelle K. Lee
*Director of the United States Patent and Trademark Office*